Patented June 5, 1934

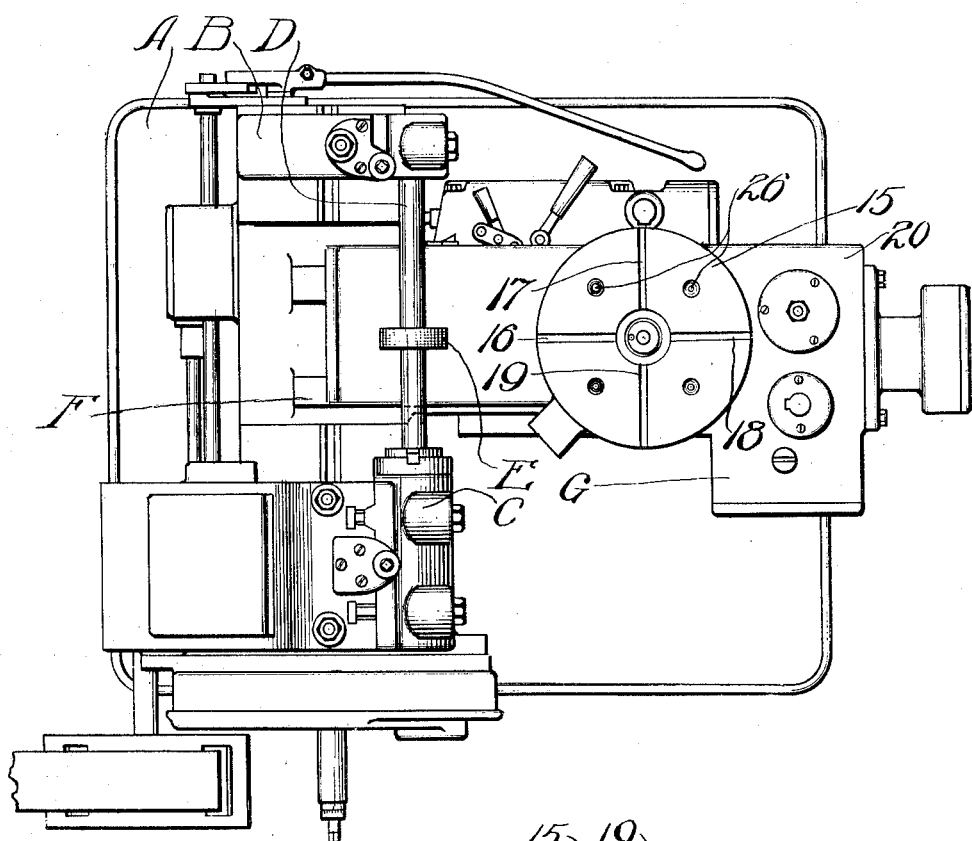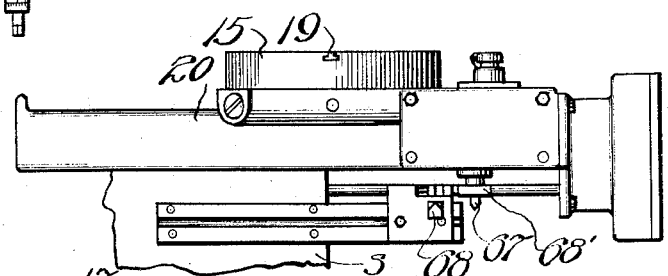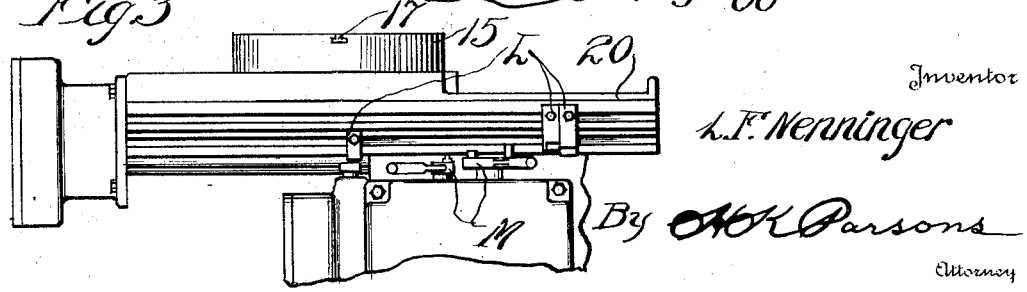

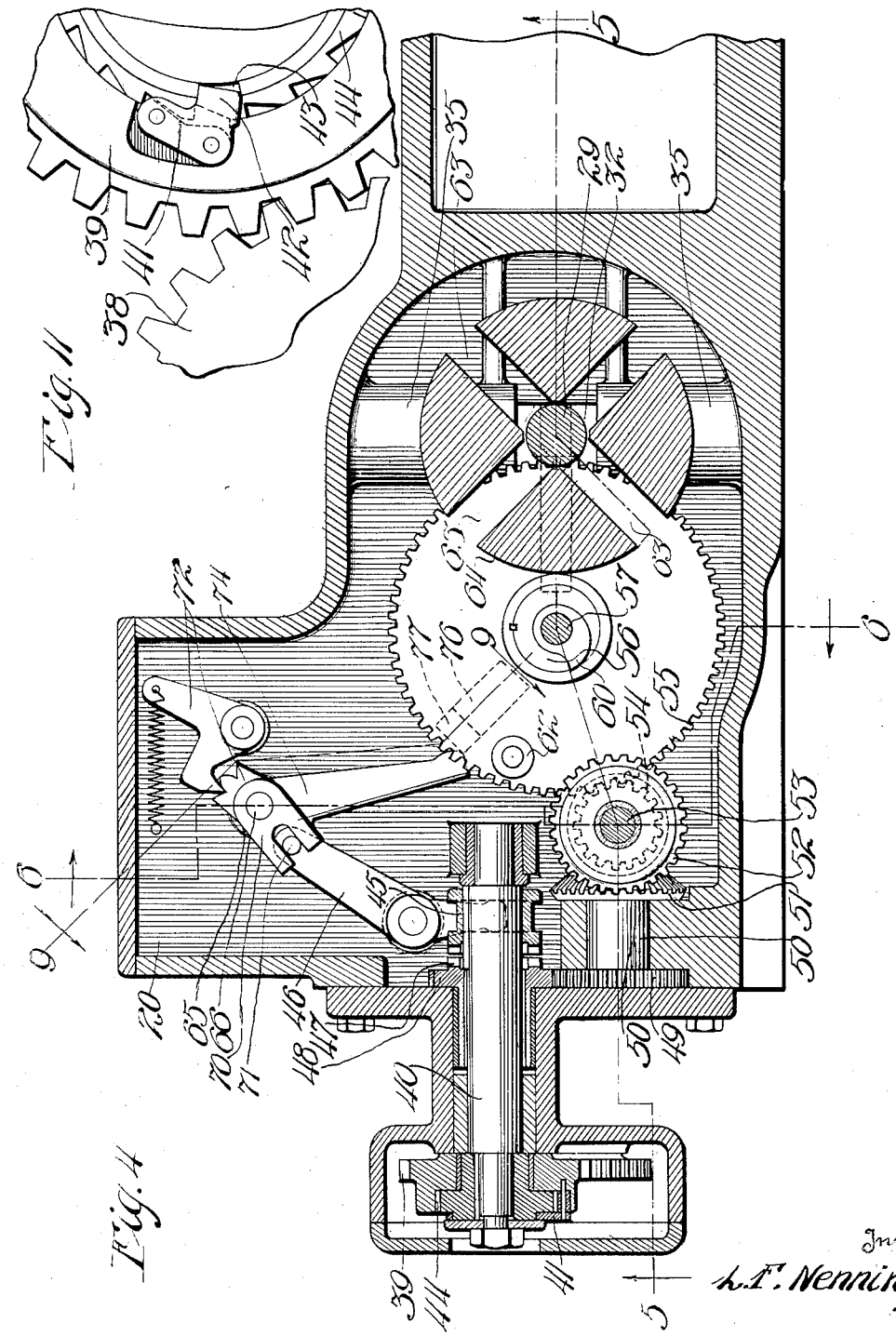

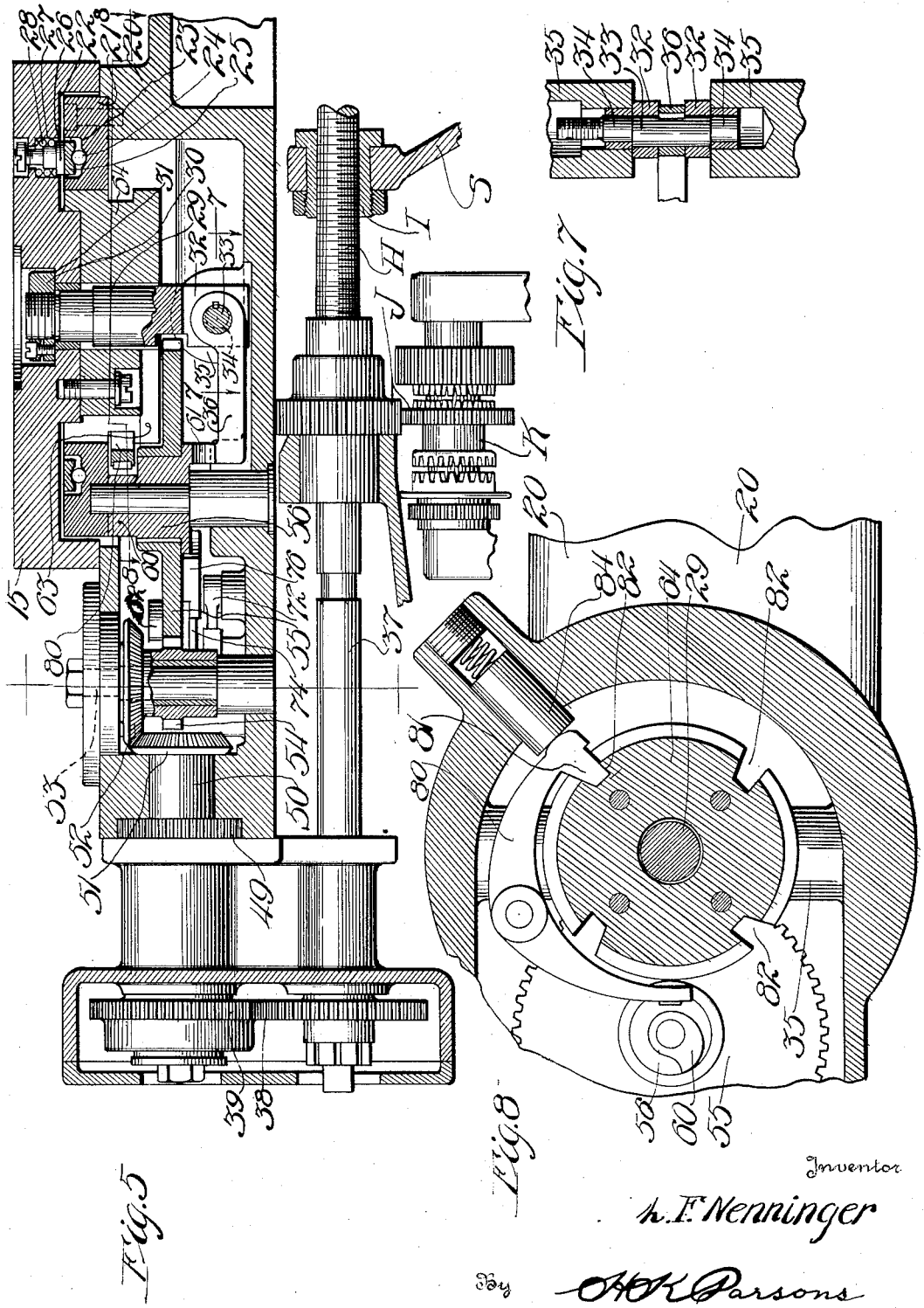

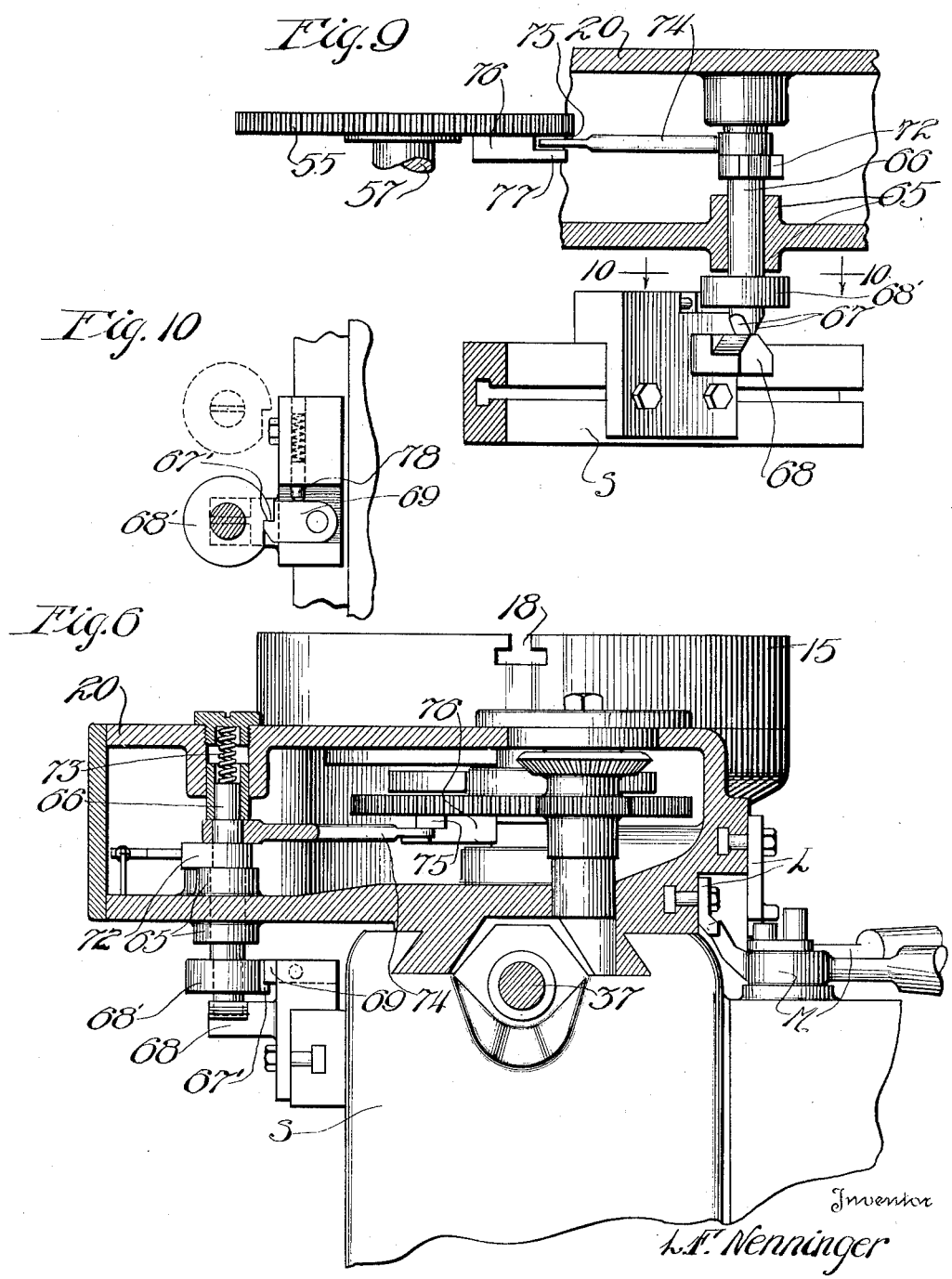

1,961,522

UNITED STATES PATENT OFFICE 1,961,522

MILLING MACHINE

Lester F. Nenninger, Cincinnati, Ohio, assignor to The Cincinnati Milling Machine Company, Cincinnati, Ohio, a corporation of Ohio Application July 22, 1926, Serial No. 124,210

11 Claims. (Cl. 90—20)

This invention relates to improvements in milling machines and has particular reference to a novel and improved mechanism for controlling the presentation of work to the milling cutter.

In order to secure maximum production on a milling machine it is necessary that the idle time of the machine be cut down as far as possible and that the machine be so constructed that one work piece will be in operation while a completed piece is being removed and new work inserted by the operator.

It is an object of the present invention to provide an improved machine which shall be automatic in operation and will provide for minimum elapsed time between cutting operations.

A further object of the present invention is the provision of a novel and improved form of indexing fixture for use on a machine tool or the like, together with improved means for controlling the indexing movements thereof.

Another object of the invention is the provision of a unitary control mechanism for the locking, releasing and rapid rotation of an indexing fixture.

Other objects and advantages of the present invention should be readily apparent by reference to the following specification taken in connection with the accompanying drawings and it will be understood that any modifications may be made within the scope of the appended claims without departing from or exceeding the spirit of the invention.

Figure 1 is a plan view of the milling machine equipped with the present improvements.

Figure 2 is a fragmentary view of the left side thereof illustrating the automatic controls for the indexing mechanism.

Figure 3 is a similar view of the right-hand side of the machine showing the automatic table controls.

Figure 4 is a horizontal sectional view of the indexing fixture.

Figure 5 is a longitudinal section thereof as on the line 5—5 of Figure 4.

Figure 6 is a sectional view on the line 6—6 of Figure 4.

Figure 7 is a fragmentary view on the line 7—7 of Figure 5.

Figure 8 is a horizontal section on the line 8—8 of Figure 5.

Figure 9 is a fragmentary vertical section on the line 9—9 of Figure 4.

Figure 10 is a section on line 10—10 of Figure 9, and Figure 11 is a fragmentary view in elevation of the safety pawl drive mechanism.

In the drawings in which similar characters of reference are employed to denote corresponding parts throughout the several views, the letter A designates the bed of a milling machine having the columns or uprights B and C supporting the cutter arbor D which bears the cutter E. The bed is further provided with guide-ways F for the reciprocating table G. Suitable mechanism such as the feed screw H and nut I may be employed to impart reciprocating movement to the table as by drive gears J and reverser clutch K. The particular mechanism employed may be that of any conventional milling machine structure and is not therefore more particularly described. In connection with such conventional reciprocating table machines of the type here illustrated, use is made of the control dogs L, serving in conjunction with the trips M to cause the table to first move in at a rapid rate, then slow down during the cut and reverse to starting position at a rapid rate.

To secure maximum efficiency of the machine when operating for example on small pieces, considerably more time is required for an operator to remove the completed work from the machine and substitute and clamp new work pieces, than is required for the actual cutting operation. To care for this condition use is made of a rotary index table 15 which as shown has a work position as at 16 and three other work receiving clamp fixtures 17, 18 and 19, so that there are three idle stations for removal and loading for one at which the cutting operation is being carried on.

Ordinarily the entire indexing fixture is constructed as a separate unit applicable to a standard milling machine. This unit comprises the frame portion 20 supporting the bearing and positioning ring 21 received within an annular recess 22 on the underside of the index table 15. This bearing ring has a race 23 for the bearings 24 designed to facilitate free rotation of the fixture. Resting upon these ball bearings is an annular race 25 having upwardly projecting threaded studs 26. The index table 15 has apertured sockets 27 at a plurality of points, receiving springs 28 bearing respectively against the ends of the sockets and the base of the studs and tending to lift the table 15 upward as respects the bearings, so that there is normally a clearance between the frame 20 and the lower edge of the table. With this clearance and the weight of the table carried by the balls a very smooth and easy action is insured. At the same time and in order that the index table may be rigidly locked when in working position, there is provided the central clamp member 29 extending upward through frame 20 and table 15 and having at its upper end the adjustable nut 30 received within a recess in the table and adapted to bear against the shoulder 31. This clamp member is provided with the furcations or ears 32 engaging the spindle 33, having the eccentric or crank terminal portions 34 journaled in ears 35 of frame 20. A lever 36 serves to rock spindle 33 and thus exert a cam action drawing the clamp down to rigidly hold the table in place as is clearly indicated in Figure 5 of the drawings. The manner of automatic control of this lever will be later described.

The general arrangement of the specific embodiment of the invention here illustrated will be best understood by reference to Figures 4 and 5 from which it will be noted that power for operation of the mechanism is supplied through the gear connection J to shaft 37 which is provided with a pick-off or change gear 38 meshing with a gear 39 loosely mounted on shaft 40. Gear 39 is provided with a safety pawl 41 having a knockout 42 adapted for engagement between the ends of friction ring 43 on ratchet 44 which is keyed on shaft 40. Rotation of gear 39 in a clockwise direction will cause a corresponding driving of shaft 40 while upon any rotation of gear 39 in a reverse direction, the interengagement of parts 42 and 43 will kick pawl 41 out of driving relation to ratchet 44 and the parts will thus remain out of engagement until by clockwise rotation the knockout member 42 is swung by the friction ring and the pawl will reengage with the ratchet to drive shaft 40. Shaft 40 has splined thereon the face clutch 45 controlled by clutch shift lever 46. This clutch member is adapted to be engaged with the clutch face 47 of gear 48 rotatably supported concentric with shaft 40 for actuation thereby. This gear meshes with a second gear 49 on the stub shaft or axle 50 which also bears a mitre gear 51 in mesh with a second mitre gear 52 rotatably supported on spindle 53. Gear 52 has integral therewith or secured thereto a hub having a spur gear portion 54 in mesh with the large gear member 55. This member in turn is keyed to the control cam 56 which is rotatably mounted on the stud 57. This control cam has an upper wiper cam 60 and a lower face cam portion 61. This latter cooperates with the end of clamp lever 36 to hold the parts in clamping position when the cam and lever are in engagement while releasing this action as the cam lug is shifted out of engagement of the lever by rotation of the combined gear and cam member. This allows springs 27 to expand, raising the table in position for free rotation. Gear 55 is provided on its upper face with a roller 62 adapted for engagement in one of the slots 63 of block 64 secured to the underside of table 15. This mechanism forms in effect a Geneva movement, so that upon each rotation of gear 55 the table will be advanced a quarter of a turn. This action is automatically effected upon the cyclic back and forth strokes of the main milling machine table G. By reference particularly to Figures 4 and 6 it will be noted that frame 20 has a double bossed portion as at 65, serving to slidably support the trip pin 66, having a lower double bevelled end 67 adapted to ride up and down over trip dog 68 adjustably secured on the side of the milling machine saddle portion S. As shown in Figure 9 withdrawing or outward movement of the table and associate parts will cause the trip pin 66 to be lifted to its uppermost position as indicated in Figure 9. As it reaches this position shoulder 67' on trip pin collar 68' will interengage with the pivoted latch dog 69, so that continued outward movement of the milling machine table will rotate pin 66. This pin has a slotted arm 70 engaging a pin 71 on the clutch shift lever 46 and the rotating movement thus imparted serves to swing arm 70 in a counter-clockwise direction as viewed in Figure 4, thus causing interengagement of clutch faces 45 and 47, so that power is applied through the previously described connections to rotate gear 55. A conventional cam and spring pressed pawl mechanism 72 serves to accentuate the movement of pin 66 and hold it with the clutch in engaging position. It will be understood however, that as the table has moved outwardly pin 66 will be pressed downward by action of spring 73 into its normal lower position as particularly illustrated in the section Figure 6. The pin is provided with an arm 74 which in raised position swings through the slot or passageway 75 between stop 76 and gear 55. In its normal or depressed position however, arm 74 projects into the path of movement of tongue 77 on stop 76 as is clearly shown in Figure 6. Consequently, while it is possible for the arm to be shifted when the pin and arm are lifted by dog 68, as the gear is rotated, tongue 77 will contact with arm 75, snap in a reverse direction disengaging the clutch and thus stopping rotation of gear 55, so that the rotative movement is limited to a single turn, giving a quarter turn to the index table for each stroke of the milling machine table. To prevent possible actuation of the parts on the working stroke, latch member 69 is pivoted to swing back out of the way against the action of spring pressed plunger 78.

Machines of the character here described are intended for precision work within very fine limits and it is therefore necessary that some means be provided for insuring proper lining up of the index table in each position of rotation with the remainder of the milling machine. This is accomplished through the medium of locking lever 80 having a wedge end 81 for selective engagement in notches 82 of disk 64 secured to and forming a part of the index table 15. A spring actuated plunger 84 at all times urges wedge 81 in the direction of the notched plate 64. Intermittently however, and in advance of the engagement of roller 62 with Geneva plate 64 the wiper cam 60 temporarily contacts with the opposite end of lever 80, disengaging member 81 from notch 82 and holding it in disengaged position until the actuation of the Geneva movement has started rotation of the index table. The cam then releases the lever, allowing it to automatically seat itself as the next notch is brought around.

From the foregoing description the construction and operation of the present invention should be readily understood and it will be seen that the parts being initially set, a suitable actuation of the control handles at the right of the machine will cause the work table to move toward the cutter, first at a rapid rate and subsequently at a slower or feeding rate, until reversed by the dogs L and caused to feed outward. During such outward movement the trip pin 66 is first raised to disengage control arm 74 from stop 76, after which the drive clutch 45—47 is thrown in, applying power to gear 55. Upper cam on gear 55 releases the rotation lock 81, while movement of cam 61 away from lever 36 releases the clamp, so that the index table itself is free to readily rotate with the work thereon as roller 62 is engaged in and passed around through the proper receiving slot therefor. Continued movement of gear 55 then causes stop 76 to strike arm 74, throwing out the power clutch when the index table will be automaticaly secured in position for the next operation as the milling machine table makes its inward stroke. It will thus be noted that there has been provided a mechanism in which the release and clamping of the index head is entirely automatically effected on each stroke of the table, so that the operator has merely to look after the loading and unloading of the work holding fixtures on the table and is relieved of all worry in connection with rotation or manual control of the engagement of the work with the cutter.

It is to be particularly noted in connection with the present invention that use is made of a rapidly moving power actuated mechanism for insuring a very quick rotative or indexing movement of the table member. This is due to the fact that the power shaft 37 on the return movement of the main support or table is being rotated at a rapid rate of speed and the gear connection is such that a correspondingly rapid power movement is transmitted to the table. This has the advantage that a quick withdrawal and return movement may be given the main table or support and the index table will be turned to bring the new working station in position for presentation of the cutter in a minimum of time, but without shock or vibration as might be the case if plain lever mechanism or like were employed. As a matter of fact with the particular mechanism here shown the indexing may be accomplished in a fractional part of a second. Also, as no attention is required from the operator, the operator is free to remove finished work pieces and replace with unfinished blanks and there is minimum lost time on his part on account of shifting of the table.

I claim:—

1. In a mechanism of the character described, the combination with a stationary member, of a table reciprocable thereon, an indexing table mounted on said first table and rotatable with respect thereto, power means for effecting such rotation, a clutch controlling arm for regulating the operation of said power means, a release dog and actuating dog on the fixed support for respectively releasing and shifting the arm to move the clutch into operative position, and additional means for reversely shifting the arm.

2. An automatic intermittent indexing work support for a milling machine, including a frame member, a table member rotatably mounted thereon, a Geneva movement for imparting step by step indexing movement to the table, said movement including a rotatable gear, a power drive for said gear, including a reversible power shaft and a transmission shaft operable therefrom in a single direction only, a clutch for operatively connecting said second shaft and gear, dog operated means for shifting the clutch into operative position, and means operated by rotation of the gear for shifting the clutch into inoperative position.

3. An automatic intermittent indexing work support for a milling machine, including a frame member, a table member rotatably mounted thereon, a Geneva movement for imparting step by step indexing movement to the table, said movement including a rotatable gear, a power drive for said gear, including a reversible power shaft and a transmission shaft operable therefrom in a single direction only, a clutch for operatively connecting said second shaft and gear, dog operated means for shifting the clutch into operative position, and a knockout on the gear for shifting the clutch into inoperative position.

4. In a mechanism of the character described, the combination with an indexible table, of a disk associated therewith having notches formed therein corresponding in number to the stations of the table, a positioning device selectively engageable with said notches for securing the table in desired indexed position, means for clamping the table in such indexed position, and a rotatable control device having cam portions alternately operable to actuate the clamp and to release the station positioning device.

5. A device of the character described, including a support, a table rotatably mounted on the support, means for locking the table in desired rotatably adjusted position, additional means for clamping the table to its support, a control member adjacent the table having cam portions operatively engaging the clamping and locking mechanisms, and means on said control member for imparting a rotative movement to the table when the clamping and locking means are in released position.

6. In a mechanism of the character described, the combination with a support, of an index table rotatably mounted on the support, a pawl member for locking the table at any one of a plurality of indexed positions, a clamp for securing the table to its support, and a control member for sequentially releasing the clamp and the locking device and for imparting an indexing movement to the table after said parts have been released.

7. In a mechanism of the character described, the combination with a support, of an index table rotatably mounted on the support, a pawl member for locking the table at any one of a plurality of indexed positions, a clamp for securing the table to its support, a control member for sequentially releasing the clamp and the locking device and for imparting an indexing movement to the table after said parts have been released, and resilient means for pressing the locking device into engagement with the rotating member to limit its movement to the correct station position.

8. In mechanism of the character described, the combination with a bed or support of a main table reciprocable thereon, a supplemental table carried by the main table for rotary movement relative thereto, power means for effecting said rotary movement including a slidably supported oscillatable plunger, a clutch coupled therewith, a clutch lock-out, and means for successively sliding the plunger to release the lock-out and rotating the plunger to shift the clutch into operative engagement.

9. In a milling machine structure, the combination with a bed, of a table mounted for reciprocation thereon, a supplemental table rotatably supported by the first, a screw member for effecting reciprocation of the main table, means for rotating said screw, the screw having a gear secured thereon for rotation therewith, means coupling the gear on the screw with the rotatable table for actuation of the rotatable table on rotation of the screw, said means including a driven gear, a contained circular ratchet and a unidirectional pawl member carried by the gear for cooperation with the ratchet to actuate the latter upon rotation of the screw in one direction while riding idly there-over on rotation of the screw in a reverse direction.

10. In a machine of the character described, the combination with a main table member, of a supplemental table rotatably supported thereby, means carried by the main table for imparting rotation to the supplemental table including a rotary disc having a plurality of cam portions, a station index locking device for the rotary table operatively associated with one of said cam portions, a table clamping member operatively associated with another of said cam portions and means for eliminating frictional rotation and retardance of the supplemental table when the clamp is released.

11. In a machine tool having a fixed bed, a power source associated therewith and a support movable thereon the combination of a base member removably attachable to said support, a table member rotatably indexable on said base, said base and table having complementary bearing surfaces upon which said table is supported for said indexing movement, clamp members operable to cause engagement of said surfaces to clamp said table with said base, a drive member journaled in said base and having an exposed coupling end, a clutch member driven therefrom, transmission members connectible with said clutch member and respectively operative alternately on said clamp members and for table indexing, all said members being portions of a device unitarily removable and attachable with said base, and a transmission extending from said power source and providing a coupling member engaging said coupling end.

LESTER F. NENNINGER.